Feb. 9, 1960 P. SCHAGEN ET AL 2,924,656
SCANNING DEVICE
Filed Sept. 11, 1957
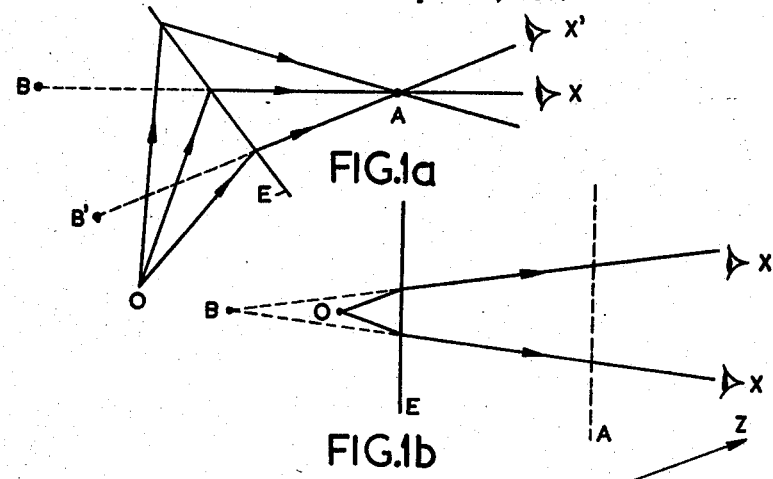
FIG.1a
FIG.1b
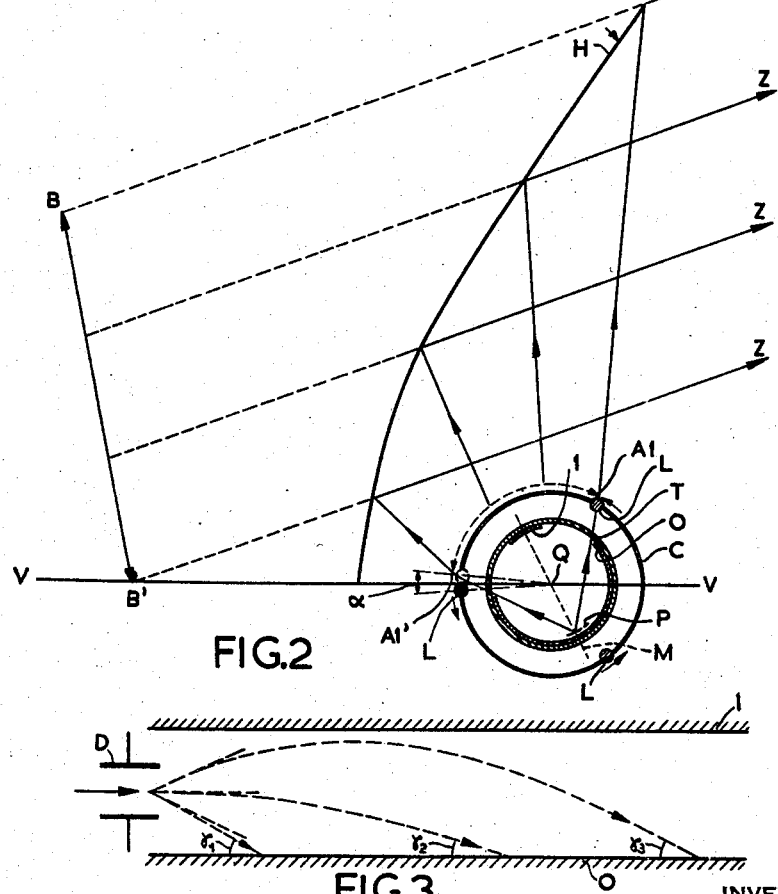
FIG.2
FIG.3
INVENTOR
P. SCHAGEN &
N.D.R. CALDER
BY
AGENT

United States Patent Office 2,924,656
Patented Feb. 9, 1960

2,924,656

SCANNING DEVICE

Pieter Schagen, Salfords, near Redhill, and Nigel David Ritchie Calder, Crawley, England, assignors to North American Philips Company, Inc., New York, N.Y.

Application September 11, 1957, Serial No. 683,321

Claims priority, application Great Britain October 4, 1956

11 Claims. (Cl. 178—7.6)

The invention relates to a scanning device for the display of images, more particularly of images composed of a raster of parallel lines, this device comprising a rotatable carrier or support for a plurality of similar, cylindrical or substantially cylindrical, optical means, of which the generatrices of the curved surfaces extend parallel to the axis of rotation of the said carrier, the disposition of these means relative to the said axis being the same for all means.

With television apparataus having a rectangular raster, it may in certain cases be desirable to perform the comparatively slow frame scan by mechanical means in order to obtain an easier solution for other problems. This may apply, for example, to the reproduction of colour television images owing to the required complicated scanning device.

It has been suggested to arrange the required source of light outside the said carrier, the line scan being carried out by conventional means and the luminous path formed being reflected by the optical means constructed in the form of mirrors.

This method has the disadvantage that the whole device becomes very bulky and that, moreover, owing to unwanted reflections the contrast range to be ensured is reduced.

The scanning device according to the invention obviates this disadvantage and has the feature that the optical means are constructed in the form of lenses and that inside the said carrier, within the paths of the said lenses, provision is made of stationary parts to produce a luminous spot, which is animated repetitively along a substantially straight path, so that a line scan on a stationary or substantially stationary path is performed parallel to the axis of rotation of the said carrier. Opaque masks are disposed between two adjacent lenses. The light thus produced is projected by means of the said lenses onto stationary, cylindrical or substantially cylindrical magnifying means and which magnifying means magnify the travelling image while the carrier rotates, these means being disposed at the side of the rotatable carrier in such a manner that the focal line of the magnifying means and the axis of rotation of the carrier coincide or extend substantially parallel to each other.

A further embodiment of the invention is characterized in that the stationary means may be constituted by the display screen of a cathode-ray tube, which is arranged wholly or partly within the said carrier while the display screen to be scanned in a horizontal direction or at least its active part is located completely inside the carrier.

A further advantage may be obtained in accordance with the present invention by not using a conventional cathode-ray tube, but by using such a tube as can be arranged completely inside the carrier.

The scanning device has a further feature in that the deflection of the electron beam is performed, within the cathode-ray tube used for this purpose, in the plane of the electron beam, in which plane also lies the centre line of the display screen, which line may, as an alternative, extend parallel to the said plane and parallel to the axis of rotation, while the electron gun which emits the electrons is arranged at one of the ends of the carrier.

A possible embodiment of the scanning device according to the invention will be described with reference to the figures of the accompanying drawing in which:

Figs. 1a and 1b show diagrammatically the lenses employed;

Fig. 2 shows one embodiment of a device according to the invention; and

Fig. 3 shows a cross-section of a suitable cathode-ray tube, this section being taken in the longitudinal direction of this tube.

Referring to Fig. 1a, reference letter E designates a cylindrical lens. If an object disposed at O is observed, astigmatic deformation will occur, since the rays emanating from O will diverge from the image axis A, which extends parallel to the cylinder axis, in a plane at right angles to the axis of the cylinder, i.e. in the plane of the drawing. The position of the axis A depends on the characteristics of the lens and on its disposition relative to the eye X of the observer and the object O. Consequently, if the two eyes of the observer are at the positions X and X', i.e. in a plane at right angles to the cylinder axis of the lens, the image seems to be produced on the axis A.

It should be noted here that the term "cylindrical lens" is to be understood to mean herein a lens having curved surfaces produced by the movement of straight generatrices, the orientation of which is kept constant, and which surfaces have a cross-section at right angles to the generatrix formed by one or more curved lines having no points of inflection. The term "cylindrical" is therefore not restricted to circular or elliptical cross-sections; it may include also double-convex and plano-convex lenses and with a particular preferred embodiment the cross-section is a complete circle, so that the lens has the shape of a rod, which can be readily manufactured.

If the plane of observation comprises the image axis A (see Fig. 1b), the rays diverge from an image point, of which the distance from the eye is equal to the total optical path of the object point O to the eye. If, for example, both eyes are on the line X (corresponding to the line at right angles to X of Fig. 1a), the rays seem to diverge from the image point B. Similarly, the rays seem to diverge from the point B', if the two eyes are on a line X' (corresponding to the line at right angles to X' of Fig. 1a).

In both cases the axis A represents, so to say, a slit through which the image can be viewed, so that a slit image is produced.

The same effect is obtained, if the optical element constitutes a cylindrical mirror. In this case, the eye X and the object O are disposed on the same side of the optical element and the position of the axis A depends on the characteristics of the mirror and on the position of the latter relative to the eye X and the object O.

It should be noted, moreover, that the term "cylindrical magnifying means" is to be understood to mean an optically magnifying element constituted by a cylindrical, reflecting surface or a cylindrical lens or an optical equivalent thereof. The term "cylindrical, reflecting surface" is employed herein to indicate a reflecting surface which is formed by the movement of straight generatrices, of which the orientation is kept constant, the cross-section at right angles to the generatrices being formed by a line having no point of inflection. Such reflecting surfaces may, for example, be parabolic or hyperbolic mirrors.

The construction of the device will be described with reference to Fig. 2 for a television scanning system. Reference letter T designates the cross-section of a suitable cathode-ray tube, of which Fig. 3 is a sectional view in the longitudinal direction.

Such an already known cathode-ray tube is extremely good for use in the scanning device described here and will therefore be referred to herein briefly. In Fig. 3 reference letter D designates a set of deflection plates between which pass electrons deflected along one of the broken lines, in accordance with the value of the potentials at the electrodes 1 and O or with the potential difference between the plates D.

If, for example, 1 is positive relative to O, the electrons will perform a parabolic path and finally strike O at an angle $\gamma$, the phosphor provided there being excited. By varying the potential at one or at both electrodes and/or the potential difference between the plates D, the electrons may be caused to strike in succession each part of the electrode O. In other words, the electron beam scans the screen P disposed at O, shown in Fig. 2, in a direction from left to right or conversely, so that a luminous path is formed, since the phosphor provided on the strip P is excited by the impact of the electron beam.

The measure of excitation depends on the instantaneous intensity of the impacting electron beam, so that by modulating this beam in accordance with the television input signal, a horizontal line of the total image to be displayed is obtained. See our copending application, Serial No. 673,790, filed July 24, 1957, for a more complete description of such a line-scanning cathode-ray tube.

The use of this tube in the scanning device described above has the advantage that a comparatively small carrier can be employed.

Fig. 2 is a sectional view of the cathode-ray tube T, wherein M designates the line through which goes the plane of the drawing of Fig. 3. The electrons will thus be moved up and down in the plane going through the line M, so that they will excite the screen P at different points.

The electrodes O and 1 have each a constant, but with respect to each other unequal width, which is evident from Fig. 2.

The deflection voltages at the electrodes are chosen to be such that the electrons are repelled by the narrower electrode 1 and attracted by the wider electrode O. It appears that the path of the electrons in the plane going through M is substantially sinusoidal.

The electron gun emitting the required electrons may be provided at one of the ends of the carrier; for structural reasons it is advisable to cause the axis of the cathode-ray tube, the envelope of which is cylindrical, to coincide with the axis of rotation Q of the carrier or support C. The tube T is surrounded as intimately as possible by the carrier C and the latter is shown in the form of an opaque cylinder C, in which are disposed three straight, cylindrical lenses L in the form of rods. These lenses L extend parallel to the screen P. An aperture (not shown) is provided at one of the ends of the carrier to permit the disposition of the tube T and/or a support therefor.

The carrier C rotates at a speed which is equal to one third of the raster frequency, so that the light of the luminous path formed by the luminescing phosphor of the screen P is projected in succession through the rotating lenses L onto a stationary, cylindrical, reflecting surface H. The cylindrical magnifying means are constituted by the cylindrical lenses L and the cylindrical reflecting surface H; the latter may be a hyperbolic or a parabolic mirror. If H is a hyperbolic mirror, the focal line (i.e. the locus of the focal spots) and the axis of rotation Q coincide completely or substantially completely and the plane of the axes i.e. the plane formed by the main axes of the hyperbolas forming the mirror is designated by VV. The opaque wall of the carrier C operates as a mask to prevent a direct view of the source of light P. The outer surface of the carrier C must have a low reflection coefficient. To this end the outer wall of the carrier may be painted black. This has the advantage that the image contrast is enhanced, since in this case a black background is provided. Also the inner surface must have a low reflection coefficient in order to prevent unwanted reflections.

It has been found that it is to be preferred, with television display systems, to arrange the light source relatively to the rotatable carrier in a manner such that the path of the travelling slit image formed by the said light source and the lenses of the rotating carrier passes through and between the magnifying reflecting surface of the mirror H and the focal line thereof, the said magnifying reflecting surface operating in a manner such that the travelling slit image is enlarged.

With the embodiment described above the rotating carrier C produces a first travelling slit image $A_1A_1'$, which is magnified to form a second slit image (not shown), so that the observer at infinity in the direction of the arrows Z views an image having a height BB'.

The drawing shows a few beams corresponding to a few intermediate stages of the slit image $A_1A_1'$, which are reflected via the mirror H in a direction parallel to the arrows Z.

In order that no parts of the image are lost when the observer's head moves to and fro, the axial lengths of the lenses L and of the mirror H exceed the length of the line scan on the screen P of the cathode-ray tube.

The observed height of the image is slightly reduced when the observer moves in the direction of the mirror. The parts of the arrangement shown in Fig. 2, as a specific example, may be proportioned as follows:

Table (a) The cross-section of the hyperbolic mirror H (with the main axis VV) is determined by the equation: $x^2/a^2 - y^2/b^2 = 1$, wherein $a^2$ is 900 cm.$^2$ and $b^2$ is 1125 cm.$^2$ (b) Diameter of the lenses L is 1 cm.

(c) Diameter of the carrier C from the centre of a lens L is 6.8 cms.

(d) Diameter of the envelope of the cathode-ray tube T is 5 cms.

(e) Angle of rotation $\alpha$, corresponding to the image blanking period, is 9.6°.

The electrode 1 and envelope T are optically transparent.

As stated above, the hyperbolic mirror may be replaced by a parabolic mirror, but the first mirror has the advantage that the carrier C can be arranged nearer the magnifying mirror, so that a more compact unit is obtained and a further advantage is that the loss in image height, caused by a movement of the observer towards the mirror, is smaller than with the use of a parabolic mirror.

The synchronisation of the movement of the carrier by means of the incoming signals may be obtained by comparing the phase of the saw-tooth voltage, produced indirectly by the rotating carrier, with the phase of the vertical synchronizing pulses.

Each phase variation may be used to convert a corresponding variation in the degree of saturation of an apparatus, which is governed by a saturable reactor and which, in turn, governs the driving of the shaft of the rotatable carrier, into a variation in the speed of rotation of the carrier.

The saw-tooth voltage may be produced, for example, by means of a suitably shaped rotor, seated on the shaft of the carrier, and moved, during the rotation of the carrier, along a U-shaped wound stator.

In the case of a three-colour television receiver, three electron beams may be produced in the cathode-ray tube, these beams scanning three phosphor strips, which luminesce each in a given colour after having been struck by the electron beam. The width and the area of these strips are indicated in Fig. 2 by the three sections of the screen P.

The present scanning method has the advantage, especially for the use of a plurality of phosphor strips, that owing to the effect of the lenses, the line structure of the display screen may be compressed, so that a fairly coarse construction of the screen P is permissible.

The scanning system according to the invention may also be employed for the successive display of rasters in the separate colours. This may be achieved by providing a colour filter for each of the lenses or by colouring each of the lenses, so that each lens can permit a given colour to pass.

The luminescent decay time of the phosphors used must be less than 100 μsec., in order to prevent a loss in resolving power in the direction of the frame deflection, since otherwise information of the preceding line would still be visible when the next-following line is scanned by the proceeding frame scan. These phosphors must furthermore be resistant to the heavy local load and to the heat developed by the repeated line scan. They must be capable of reproducing the primary colours in a manner such that combined colours with a proportional brightness can be observed.

The scanning of the three phosphor strips may, as an alternative, be performed by means of one instead of three electron beams by moving the single electron beam with the aid of a suitable auxiliary apparatus during the line scan at high speed from one phosphor strip to the other. To this end the auxiliary control-voltage may be a sinusoidal or a sawtooth voltage. The frequency of this auxiliary voltage is usually chosen to be equal to the frequency of the subcarrier on which the colour signals are modulated. If a saw-tooth voltage is used, it is sufficient in practice to use a signal comprising the first and the third harmonic of the said frequency.

The green phosphor strips are preferably scanned twice during one period of the auxiliary alternating voltage.

If the receiver should serve both for monochrome and for colour television display, it is advisable to provide a fourth phosphor strip at the side of the green, red and blue strips, this strip luminescing in a white colour upon electron impact, and being used only for monochrome reception. This simplifies the requirements for the phosphors of the colour strips to produce a white colour, when the colour components are supplied in particular proportions.

Although in this embodiment the focal line of the mirror H coincides with the axis of rotation Q, this line and this axis may be slightly shifted relatively to one another, provided that their relative distance is small with respect to the focal distance of the cylindrically concave, reflecting surface of the mirror H.

The magnifying means should preferably produce a straight line, which is moved at uniform speed with a minimum variation in magnification, in order to obtain a line raster of the desired height.

A cylindrical lens having the desired aperture and strength is usually very large and may exhibit an appreciable chromatic aberration, although it may be subdivided into narrow, prismatic elements, for example in the form of a Fresnel lens. For this and other reasons the magnifying means should be formed preferably by a hyperbolic or a parabolic mirror.

What is claimed is:

1. An image display device comprising means for establishing a luminous line extending in a substantially straight path, rotatable means surrounding said line establishing means and having an axis of rotation extending approximately parallel to said straight path, said rotatable means including a plurality of spaced, substantially cylindrical, optical means and light-opaque means between the optical means, the substantially cylindrical, optical means constituting curved surfaces formed by parallel generatrices extending parallel to the said axis of rotation, means including said rotatable means for scanning an image with said luminous line and for projecting the image along a further optical path, and substantially cylindrical, optical magnifying means in said further optical path for receiving and reprojecting in magnified form said scanned image, the focal line of said magnifying means extending substantially parallel to the said axis of rotation.

2. An image display device comprising a stationary cathode-ray-type of device for scanning a luminous line extending in a substantially straight path, rotatable means closely surrounding said cathode-ray device and having an axis of rotation extending approximately parallel to said straight path, said rotatable means comprising a plurality of spaced, substantially identical, substantially cylindrical, elongated lenses arranged in a circle and separated by light-opaque means, the substantially cylindrical lenses constituting curved surfaces formed by parallel generatices extending parallel to the said axis of rotation, means including said rotatable means for scanning an image with said luminous line and projecting the scanned image along a further optical path, and substantially cylindrical reflecting magnifying means in said further optical path for receiving and reprojecting in magnified form said scanned image, the focal line of said reflecting means extending substantially parallel to the said axis of rotation.

3. A device as set forth in claim 2 wherein the luminous line is located on one side of the axis of rotation of the rotatable means, and the magnifying means is located on the other side of the said axis of rotation.

4. A device as set forth in claim 2 wherein the reflecting magnifying means comprises one of a concave hyperbolic and concave parabolic mirror.

5. An image display device comprising a stationary cathode-ray-type of device for scanning and establishing a luminous line extending in a substantially straight path, a rotatable cylindrical support closely surrounding said cathode-ray device and having an axis of rotation extending approximately parallel to said straight path, said rotatable support comprising a light-opaque housing carrying a plurality of equally circumferentially-spaced, substantially identical, substantially cylindrical, elongated lenses arranged in a circle on the circumference of the support, the substantially cylindrical lenses constituting curved surfaces formed by parallel generatrices extending parallel to the said axis of rotation, means for rotating the rotatable support to scan an image with said luminous line and project the scanned image along a further optical path, and substantially cylindrical reflecting magnifying means in said further optical path for receiving and reprojecting in magnified form said scanned image, the focal line of said reflecting means extending substantially parallel to the said axis of rotation.

6. A device as set forth in claim 5 wherein the outer surface of the light-opaque housing is blackened to provide a surface exhibiting a low reflection coefficient.

7. A device as set forth in claim 5 wherein the lenses are constituted by cylindrical rods and are equally spaced from one another and from the axis of rotation of the support.

8. An image display device comprising a stationary, cylindrical cathode-ray-type of device having a phosphor screen constituted of three adjacent parallel phosphor stripes luminescing in different colors for establishing a luminous colored line extending in a substantially straight path, rotatable means surrounding said cathode-ray device and having an axis of rotation extending approximately parallel to said straight path, said rotatable means comprising a plurality of spaced, substantially identical, substantially cylindrical, elongated lenses arranged in a circle and separated by light-opaque means, the substantially cylindrical lenses constituting curved surfaces formed by parallel generatrices extending parallel to the said axis of rotation, means for rotating the said rotatable means for scanning an image with said luminous line and projecting the scanned image along a further optical path, and substantially cylindrical reflecting magnifying means in said further optical path for receiving and reprojecting in magnified form said scanned image, the focal line of said reflecting means extending substantially parallel to the said axis of rotation.

9. A device as set forth in claim 8 wherein the phosphor screen includes a fourth phosphor stripe adjacent and parallel to the other stripes and luminescing in white.

10. A device as set forth in claim 8 wherein the reflecting means comprises a curved mirror whose radius of curvature at different points increases as the spacing between those points and the axis of rotation increases.

11. A device as set forth in claim 8 wherein the focal line of the reflecting means is located in the vicinity of the axis of rotation.

References Cited in the file of this patent

UNITED STATES PATENTS

| | | |
|---|---|---|
| 1,540,318 | Dunajeff | June 2, 1925 |
| 2,209,719 | Rustad | July 30, 1940 |

FOREIGN PATENTS

| | | |
|---|---|---|
| 562,193 | Germany | Nov. 5, 1932 |